May 14, 1963 F. A. SEFF 3,089,585

REELS OR THE LIKE

Filed Jan. 10, 1962

INVENTOR.
FREDERIC A. SEFF
BY Klenberg & Lilling
ATTORNEYS

United States Patent Office 3,089,585

Patented May 14, 1963

3,089,585
REELS OR THE LIKE

Frederic A. Seff, 226—33 Manor Road, Queens Village, N.Y.

Filed Jan. 10, 1962, Ser. No. 165,398
3 Claims. (Cl. 206—53)

This invention is generally in the field of reels for tapes, films, or the like; and more specifically it presents a method and means for locking a tape or film onto a reel.

Film or tape reels of varied types are well known. For example, such reels are commonly utilized in conjunction with movie picture machines, tape recorders, etc.

It is desirable that the tape or film not unwind unless and until desired. This presents a problem in that films, being semi-rigid, will have a tendency to unwind of their own accord. This problem is not only annoying to the operator but is often destructive to the film. Should a particle of dirt be entrapped between turns of the film, it may scratch and remove a portion of the emulsion therefrom, as the turns of film move relative to each other while unwinding.

Relatively complicated apparatus have been designed to retain the external end of tape or film on a reel when not in use. Such apparatus are generally very complicated and will have portions protruding from the sides of the reel. For these reasons, none of the proposed methods of retaining film or tape on a reel have been commercially accepted.

It is a cardinal object of this invention, therefore, to provide a method and apparatus for retaining film or tape on a reel.

Another object of this invention is to provide a spring holder or retainer which may be utilized to retain wound material or any portion thereof on a reel.

Still another object and accomplishment hereof is to set forth a device as above-described that may be relatively easily mass-produced in an economical fashion.

A further purpose of this invention is to describe an apparatus as set forth above without any protruding parts and that will securely lock the exposed end of the tape or film.

Yet another object hereof is to provide a reel lock that may not be removed from the reel and thus, misplaced.

Still another purpose hereof is to set forth a reel lock that may be easily activated or de-activated merely by a touch of the finger.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

Figure 1:
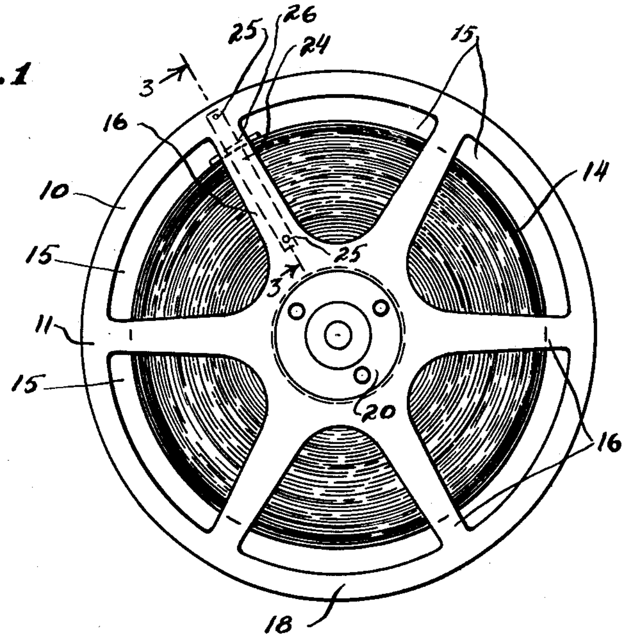
FIG. 1 is an elevational view of the invention with film wound thereon.

Referring to the drawings, which illustrate what may be for some purposes a preferred embodiment of the invention, there is illustrated generally a reel structure 10. The said reel structure will have spaced and parallel disks 11 and 12. As is conventional, the disks 11 and 12 will be disposed a distance apart slightly greater than the width of the film or tape 14 to be wound thereon. The disks may further have suitable openings 15 thereon thereby forming spokes 16 primarily to conserve material and thereby reduce the weight of the finished product. At their external ends the spokes 16 terminate in a rim 18 defining the outer boundary of the reel.

The reel structure 10 further includes an inner hub portion 20.

It is to be noted that a portion of the device above-described is conventional and will not be further described. Sufficient to say that any of the well known reel structures may be used in conjunction with this invention.

It will be noted, however, that an elongated spring member 24 will be suitably fastened to one of the spokes 16 on one of the disks 11. The elongated spring member 24 will be fastened only at its extreme ends as by rivets 25 or the like. The spring 24 will be fabricated of any suitable resilient material.

As illustrated, a spring lock 26 consisting primarily of a flat piece of rigid material will be suitably slipped about the said spring member 24. The lock will have an aperture 28 adjacent one of the ends 29 thereof. There will only be a thin piece of material 30 between the aperture 28 and end 29. The length of the lock 26 will be substantially the same as the distance between the spaced disks 11 and 12. It will be noted that because of the shape of the lock 26 and the aperture 28 therein, the said lock can lie flat against one of the spokes 16 of the disk 11 as illustrated in phantom in FIG. 3.

Figure 3:
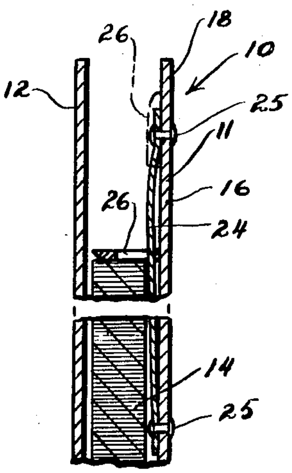
FIG. 3 is a fractional sectional view taken substantially along line 3—3 of FIG. 1.
Figure 2:
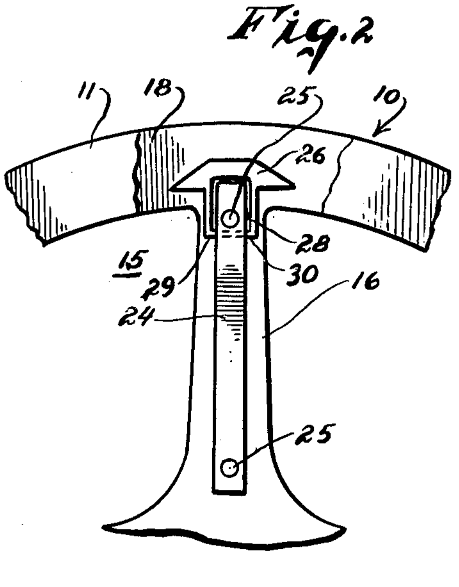
FIG. 2 is a fractional and enlarged view of a portion of the device illustrated in FIG. 1.

Alternately, however, the said lock 26 may be urged perpendicularly to the disk 11 as illustrated in solid in FIG. 3. This will cause the elongated spring member 24 to be urged tightly against the aperture end of the thin strip of material 30 preventing any movement thereof. This will retain the lock 26 in the said perpendicular position when desired. Of course the aperture 28 of the lock 26 may be provided with an extending perpendicular support to insure that the lock 26 will not spontaneously move when in its perpendicular position.

The operation of this invention is then as follows:

One end of the film or tape 14 is held against the hub portion 20 of the reel structure 10 as by insertion into a slot. The film or tape 14 or any portion thereof will then be wound or rewound onto the reel structure 10 between the disks 11 and 12.

It is to be noted that the space between disks 11 and 12 will be sufficient to accommodate the width of the film or tape 14 in addition to the width of the elongated spring member 24 and the lock 26. When the film or tape 14 or any portion thereof is wound onto the reel structure 10, it may be retained in position. This may be accomplished by means of lock 26.

The lock 26 will be urged as by a finger of the operator to a position perpendicular to the disks 11 and 12 as illustrated in solid in FIG. 3. As mentioned heretofore, this will cause the elongated spring member 24 to move slightly away from the inward side of its spoke 16. The force exerted by the elongated spring member 24 will then cause the lock member 26 to retain its position perpendicular to the disks 11 and 12. The lock member 26 may then be urged radially inward by a finger of the operator until it bears with any suitable pressure against the outermost turn of the wound film or tape 14. This will effectively lock the said film or tape 14 in position without protrusions from the side of the reel structure 10.

It is to be noted that this locking mechanism may be utilized not only to fasten the external portion of the film or tape 14 in place but may also be used to lock any intermediate portion of the film or tape as when a film is stopped after it is only partially utilized.

Of further importance is the fact that the locking arrangement herein disclosed may be utilized to bear against the film or tape with any predetermined pressure. Thus, the film or tape may be locked with any desired intensity.

Additionally, it will be realized that this locking arrangement is an integral part of the reel structure and may not be removed therefrom and thus, inadvertently lost.

The concept herein disclosed is not limited to usage in conjunction with merely a film or tape, but may be suitable for other winding applications.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention, and illustrated its use, what I claim as new and desire to secure by Letters Patent is:

1. A reel, comprising:

(*a*) an annular hub about which film is adapted to be wound, and (*b*) two parallel disks arranged about said hub to locate said film to be wound therebetween, and (*c*) an elongated spring member fastened only at its external ends to the side of one of said disks opposite said other disk, (*d*) and a thin lock member having an aperture adjacent one end thereof, (*e*) the central portion of said spring member passing through said aperture and urging at least a portion of said lock member against said one disk whereby said lock member may be retained alternately in a first position almost parallel to said one disk and a second position perpendicular to said one disk.

2. A reel as described in claim 1, wherein said lock member may be moved axially of said reel along the length of said spring member.

3. A reel as described in claim 2, wherein said spring member is fastened to said one disk by rivets passing through the external ends of said spring member and said one disk.

References Cited in the file of this patent

UNITED STATES PATENTS 2,536,949 Johnson ---------------- Jan. 2, 1951